United States Patent
Maruyama et al.

(10) Patent No.: US 8,921,457 B2
(45) Date of Patent: Dec. 30, 2014

(54) RESIN MOLDED BODY

(75) Inventors: Kosuke Maruyama, Shizuoka (JP); Kazuya Goshima, Shizuoka (JP)

(73) Assignee: Win Tech Polymer Ltd, Tokyo (JP)

( * ) Notice: Subject to any disclaimer, the term of this patent is extended or adjusted under 35 U.S.C. 154(b) by 0 days.

(21) Appl. No.: 14/128,388

(22) PCT Filed: Jun. 27, 2012

(86) PCT No.: PCT/JP2012/066404
§ 371 (c)(1),
(2), (4) Date: Dec. 20, 2013

(87) PCT Pub. No.: WO2013/002267
PCT Pub. Date: Jan. 3, 2013

(65) Prior Publication Data
US 2014/0121315 A1 May 1, 2014

(30) Foreign Application Priority Data
Jun. 28, 2011 (JP) ................. 2011-143537

(51) Int. Cl.
 C08K 3/22 (2006.01)
 C08L 31/06 (2006.01)
 C08L 67/02 (2006.01)
 C08L 69/00 (2006.01)
(52) U.S. Cl.
 CPC ............... C08L 31/06 (2013.01); C08L 67/02 (2013.01); C08L 69/00 (2013.01)
 USPC .......................................... 523/201; 524/412
(58) Field of Classification Search
 CPC .............................................. C08K 2003/2279
 USPC ................................... 523/201; 524/412, 430
 See application file for complete search history.

(56) References Cited

U.S. PATENT DOCUMENTS

| | | | |
|---|---|---|---|
| 4,900,784 A * | 2/1990 | Tabankia et al. ................. 525/67 |
| 6,242,519 B1 * | 6/2001 | Cheret et al. .................. 524/396 |
| 2007/0282040 A1 * | 12/2007 | Ai et al. ....................... 524/104 |
| 2011/0054092 A1 * | 3/2011 | Kurachi et al. ............... 524/139 |
| 2012/0190783 A1 * | 7/2012 | van Gisbergen et al. ..... 524/402 |
| 2012/0232200 A1 | 9/2012 | Ohtake et al. |
| 2013/0203905 A1 | 8/2013 | Hirakawa et al. |

FOREIGN PATENT DOCUMENTS

| | | | |
|---|---|---|---|
| JP | 2004217784 A | | 5/2004 |
| JP | 2007009143 | * | 7/2005 |
| JP | 2009035616 A | | 2/2009 |
| JP | 2009275159 A | | 11/2009 |
| JP | 2010120978 A | | 3/2010 |
| JP | 2011052096 A | | 3/2011 |
| JP | 2011132313 A | | 7/2011 |
| WO | 2011058992 A1 | | 5/2011 |
| WO | 2011148796 A1 | | 12/2011 |

* cited by examiner

Primary Examiner — Peter Szekely
(74) Attorney, Agent, or Firm — Hoffmann & Baron, LLP

(57) ABSTRACT

Provided is a resin molded body which has excellent flame retardance, weather resistance, shock resistance and tracking resistance. The resin molded body is composed of a thermoplastic resin composition comprising a thermoplastic resin, a polycarbonate, an elastomer, and a flame retardant. By adopting this combination of components, a Charpy impact value at 23° C. measured in conformity with ISO 179/1eA is 15 kJ/m2 or more and flame retardance measured under a condition of thickness of 1.0 mm and in conformity with UL94 is V-0 or more, and a resin molded body which can be used favorably outdoors is produced.

9 Claims, No Drawings

RESIN MOLDED BODY

CROSS-REFERENCE TO RELATED APPLICATIONS

This application is the National Stage of International Application No. PCT/JP2012/066404, filed Jun. 27, 2012, which claims the benefit of Japanese Application No. 2011-143537, filed Jun. 28, 2011, the entire contents of all of which are incorporated by reference herein.

TECHNICAL FIELD

The present invention relates to a resin molded body which has excellent flame retardance and shock resistance.

BACKGROUND ART

Thermoplastic resins such as a polyolefin resin, a polyester resin, a polyamide resin, and a polyether resin are used as raw materials of electrical and electronic parts because of excellent electrical characteristics, chemical resistance, and water resistance.

Especially in electrical and electronic parts, high fire safety is required, and various standards relating to flame retardant processing, typified by UL Standards in the USA, are often required (see, for example, Patent Document 1). As a technique for imparting flame retardance to a thermoplastic resin, a technique in which a halogen compound containing chlorine or bromine is mixed in a thermoplastic resin has been known. In order to further enhance the flame retardant effect, use of a halogen compound in combination with an antimony compound is also performed. In case electrical and electronic parts are used under a high voltage, like a power supply, tracking resistance is also required. As a technique for imparting flame retardance and tracking resistance to electrical and electronic parts, a technique in which a combination of a phosphorous-based flame retardant and a nitrogen-containing compound is mixed has been known (see, for example, Patent Document 2).

[Patent Document 1] Japanese Unexamined Patent Application, Publication No. 2010-120978

[Patent Document 2] PCT International Application, Publication No. 2011/148796

DISCLOSURE OF THE INVENTION

Problems to be Solved by the Invention

However, a thermoplastic resin composition containing a halogen compound and an antimony compound, or a phosphorous-based flame retardant and a nitrogen-containing compound mixed therein is likely to cause deterioration of mechanical properties such as shock resistance. In case a number of physical properties are required to the thermoplastic resin composition, it is difficult to adjust a number of physical properties of the thermoplastic resin composition in a desired range. However, shock resistance is required in electrical and electronic parts used outdoors, in addition to flame retardance, and also weather resistance is required. In case the thermoplastic resin composition is used in high voltage parts such as a power supply, tracking resistance is also required.

The present invention has been made so as to solve the above-mentioned problems, and an object thereof is to provide a resin molded body which is excellent in any of flame retardance, weather resistance, shock resistance, and tracking resistance.

Means for Solving the Problems

The present inventors have intensively studied so as to solve the above-mentioned problems. As a result, they have found that the problems are solved by using a thermoplastic resin, a polycarbonate, an elastomer, and a flame retardant in combination, thus completing the present invention. More specifically, the present invention provides the followings.

(1) A resin molded body, which is used outdoors, composed of a thermoplastic resin composition including a thermoplastic resin, a polycarbonate, an elastomer, and a flame retardant, wherein a Charpy impact value at 23° C. measured in conformity with ISO179/1eA is 15 kJ/m$^2$ or more, and flame retardance measured under the conditions of a thickness of 1.0 mm in conformity with UL94 is V-0 or more.

(2) The resin molded body according to (1), wherein a Charpy impact value at −40° C. measured in conformity with ISO179/1eA is 5 kJ/m$^2$ or more.

(3) The resin molded body according to (1) or (2), which is a connector for electrical and electronic parts, a plug, or a storage housing for storing electrical and electronic parts.

(4) The resin molded body according to (3), wherein the connector is a component of a solar battery, a component of a breaker, a component of a switch, or a component of an electric vehicle.

(5) The resin molded body according to any one of (1) to (4), wherein the thermoplastic resin is polybutylene terephthalate, and the thermoplastic resin composition contains: 25% by mass or more and 70% by mass or less of polybutylene terephthalate, 10% by mass or more and 50% by mass or less of a polycarbonate, 5% by mass or more and 20% by mass or less of an elastomer, and 10% by mass or more and 15% by mass or less of a flame retardant.

(6) The resin molded body according to any one of (1) to (5), wherein the flame retardant is a bromine-containing acrylic resin, and the thermoplastic resin composition further contains 2% by mass or more and 10% by mass or less of antimony trioxide.

(7) The resin molded body according to any one of (1) to (6), wherein the elastomer is a core-shell elastomer.

(8) The resin molded body according to any one of (1) to (7), wherein the thermoplastic resin composition exhibits a melt viscosity of 0.20 kPa·s or more and 0.40 kPa·s or less at a temperature of 260° C. and a shear rate of 1,000 sec$^{-1}$.

(9) The resin molded body according to any one of (1) to (8), wherein the thermoplastic resin composition exhibits a comparative tracking index of 0 or 1 measured in conformity with IEC112, Third Edition, using an aqueous 0.1% ammonium chloride solution and a platinum electrode.

(10) The resin molded body according to any one of (1) to (8), wherein the thermoplastic resin composition exhibits a comparative tracking index of 0 measured in conformity with IEC112, Third Edition, using an aqueous 0.1% ammonium chloride solution and a platinum electrode.

Effects of the Invention

The resin molded body of the present invention is excellent in any of flame retardance, shock resistance, and weather resistance. Therefore, the resin molded body of the present invention can be suitably used as electrical and electronic parts used outdoors, or components of electrical and electronic parts.

PREFERRED MODE FOR CARRYING OUT THE INVENTION

Embodiments of the present invention will be described below. The present invention is not limited to the following embodiments.

The resin molded body of the present invention is composed of a thermoplastic resin composition including a thermoplastic resin, a polycarbonate, an elastomer, and a flame retardant, wherein a Charpy impact value at 23° C. measured in conformity with ISO179/1eA is 15 kJ/m$^2$ or more, and flame retardance measured under the conditions of a thickness of 1.0 mm in conformity with UL94 is V-0 or more, the resin molded body being used outdoors.

Thermoplastic Resin Composition

The thermoplastic resin composition composing the resin molded body of the present invention includes a thermoplastic resin, a polycarbonate, an elastomer, and a flame retardant.

Use of the polycarbonate in combination with the elastomer is capable of imparting shock resistance to the resin molded body, and also optimization of flame retardant enables suppression of deterioration of shock resistance. Accordingly, the resin molded body of the present invention is excellent in both flame retardance and shock resistance. A combination of the polycarbonate, the elastomer, and the flame retardant is also capable of imparting weather resistance to the resin molded body.

There is no particular limitation on the thermoplastic resin and it is possible to use, for example, polyphenylene ether, polyamide, polyester, polypropylene, polyphenylene sulfide, liquid crystal polymer, polystyrene, rubber reinforced polystyrene, acrylonitrile-(butadiene)-styrene copolymer, and the like. Of these thermoplastic resins, the use of polyester is particularly preferable. Here, the thermoplastic resin does not include the polycarbonate, and the elastomer composed of the thermoplastic resin. The thermoplastic resin composition may also contain plural kinds of thermoplastic resins.

There is no particular limitation on the kind of the thermoplastic resin, and those having desired properties are used according to applications of the resin molded body. The content of the thermoplastic resin in the thermoplastic resin composition is determined so that the above-mentioned desired properties are reflected in the resin molded body. Namely, preferred content of the thermoplastic resin varies depending on the kind of the thermoplastic resin.

The polycarbonate can be produced by a solvent method, namely, in a solvent such as methylene chloride in the presence of a known acid receptor and a molecular weight modifier, using a reaction between a dihydric phenol and a carbonate precursor such as phosgene, or an ester exchange reaction between a dihydric phenol and a carbonate precursor such as diphenyl carbonate. Here, bisphenols can be exemplified as the dihydric phenol. More specifically, 2,2-bis(4-hydroxyphenyl)propane, namely, bisphenol A can be exemplified. The dihydric phenol may be those in which a part or all of bisphenol A is substituted with the other dihydric phenol. Examples of the dihydric phenol other than bisphenol A include compounds such as hydroquinone, 4,4-dihydroxydiphenyl, bis(4-hydroxyphenyl)alkane, bis(4-hydroxyphenyl)cycloalkane, bis(4-hydroxyphenyl)sulfide, bis(4-hydroxyphenyl)sulfone, bis(4-hydroxyphenyl)sulfoxide, and bis(4-hydroxyphenyl)ether; or halogenated bisphenols such as bis(3,5-dibromo-4-hydroxyphenyl)propane and bis(3,5-dichloro-4-hydroxyphenyl)propane. These dihydric phenols may be a homopolymer, or two or more copolymers of the dihydric phenol. The polycarbonate used in the present invention may be a thermoplastic randomly branched polycarbonate obtained by reacting a polyfunctional aromatic compound with a dihydric phenol and/or a carbonate precursor. The thermoplastic resin composition may contain plural kinds of polycarbonates.

The kind and the content of the polycarbonate in the thermoplastic resin composition are not particularly limited, and are appropriately determined according to the kind of the polycarbonate, the kind of the thermoplastic resin, the kind of the below-mentioned elastomer, the content of the elastomer, and the like. Particularly, one of the features of the present invention lies in that a combination of a polycarbonate and an elastomer is capable of imparting shock resistance even in the case of a resin molded body to which flame retardance is imparted by a flame retardant. Accordingly, the kind and the content of the polycarbonate can be determined so as to exert the effect.

There is no particular limitation on the elastomer contained in the thermoplastic resin composition, and it is possible to use common elastomers such as an olefin-based elastomer, a styrene-based elastomer, a polyester-based elastomer, and a core-shell elastomer.

The olefin-based elastomer is a copolymer containing ethylene and/or propylene as main component(s). Specific examples of the olefin-based elastomer include an ethylene-propylene copolymer, an ethylene-butene copolymer, an ethylene-octene copolymer, an ethylene-propylene-butene copolymer, an ethylene-propylene-diene copolymer, an ethylene-ethyl acrylate copolymer, an ethylene-vinyl acetate copolymer, an ethylene-glycidyl methacrylate copolymer, and the like.

Examples of the styrene-based elastomer include a styrene-isoprene-styrene block copolymer (SIS), a styrene-ethylene.propylene-styrene block copolymer (SEPS), a styrene-ethylene.butylene-styrene block copolymer (SEBS), a styrene-ethylene.ethylene/propylene-styrene block copolymer (SEEPS), and the like.

The polyester-based elastomer includes, for example, a copolymer containing a hard segment composed of a short chain ester, and a soft segment composed of a polyether component having a number average molecular weight of about 200 or more and 6,000 or less and a polyester component having a number average molecular weight of about 200 or more and 10,000 or less. A ratio of the hard segment to the soft segment is appropriately adjusted. Examples of the dicarboxylic acid component composing the polyester hard segment include terephthalic acid, isophthalic acid, and the like. Examples of the diol component composing the polyester hard segment include aliphatic or alicyclic diols having 2 or more and 12 or less carbon atoms, i.e. ethylene glycol, propylene glycol, 1,4-butanediol, 1,4-butenediol, neopentyl glycol, 1,5-pentanediol, and 1,6-hexanediol; bisphenols such as bis(p-hydroxy)diphenyl, bis(p-hydroxyphenyl)methane, and bis(p-hydroxyphenyl)propane, and a mixture thereof. Examples of the polyether component composing the soft segment include poly(alkylene oxide)glycol. Examples of the polyester component composing the soft segment include aliphatic hydrocarbons having 2 or more and 12 or less carbon atoms.

The core-shell elastomer has a multi-layered structure composed of a core layer (core portion), and a shell layer with which at least a part of a surface of the core layer is coated. In the present invention, a common core-shell elastomer is usable.

The kind and the content of the elastomer are appropriately determined so as to exert the effects of the present invention according to the kind of the thermoplastic resin, the content of the polycarbonate, and the like.

There is no particular limitation on the flame retardant, and examples thereof include a halogen-containing flame retardant, a phosphorus-containing flame retardant, a nitrogen-containing flame retardant, a sulfur-containing flame retardant, a silicon-containing flame retardant, an alcohol-based flame retardant, an inorganic flame retardant, an aromatic resin flame retardant, and the like. Since the kind of the flame retardant exerts an influence on shock resistance, it is necessary to select a flame retardant which is less likely to cause deterioration of shock resistance of the resin composition. As used herein, a flame retardant, which scarcely exerts an influence on the shock resistance, varies depending on the kind of the elastomer. Therefore, while taking the kind of the elastomer into consideration, the kind of suitable flame retardant is determined.

The content of the flame retardant in the thermoplastic resin composition is not particularly limited, and is determined so as to exert the effects of the present invention according to the kind and the content of other components, in the same manner as in other components.

It is also possible to contain components other than the above-mentioned essential components such as a thermoplastic resin, a polycarbonate, an elastomer, and a flame retardant. Examples of other components include a flame-retardant auxiliary, a dripping inhibitor, a stabilizer, an antioxidant, a mold releasant, a colorant, and the like.

[Polybutylene Terephthalate Resin Composition]

The thermoplastic resin molded body of the present invention is produced by using the above-mentioned thermoplastic resin composition as a raw material. Of thermoplastic resin compositions, a polybutylene terephthalate resin composition, which will be described below, is preferably used.

The polybutylene terephthalate resin composition contains 25% by mass or more and 70% by mass or less of polybutylene terephthalate, 10% by mass or more and 50% by mass or less of a polycarbonate, 5% by mass or more and 20% by mass or less of an elastomer, and 10% by mass or more and 15% by mass or less of a flame retardant.

In case the thermoplastic resin is polybutylene terephthalate, it preferably contains the polycarbonate, the elastomer, and the flame retardant in the above-mentioned contents. The respective components of the polybutylene terephthalate resin composition will be described below.

Polybutylene terephthalate corresponds to a kind of polyesters in the above-mentioned thermoplastic resin. Of polyesters, polybutylene terephthalate is particularly suitably used for electrical and electronic parts because of its excellent mechanical properties, electrical properties, heat resistance, and chemical resistance. In the polybutylene terephthalate resin composition, the content of polybutylene terephthalate is 25% by mass or more and 70% by mass or less. If the content of polybutylene terephthalate is within the above range, preferable properties mentioned above of polybutylene terephthalate tends to be imparted to the resin molded body. The content is more preferably 45% by mass or more and 55% by mass or less.

Polybutylene terephthalate is polybutylene terephthalate which is obtained by polycondensing a dicarboxylic acid component containing at least a terephthalic acid or an ester-forming derivative thereof (C1-C6 alkyl ester, acid halide, etc.) with a glycol component containing at least an alkylene glycol(1,4-butanediol) having 4 carbon atoms or an ester-forming derivative thereof. Polybutylene terephthalate is not limited to homopolybutylene terephthalate, and may be a copolymer containing 60 mol % or more (especially 75 mol % or more and 95 mol % or less) of a butylene terephthalate unit.

In polybutylene terephthalate, examples of the dicarboxylic acid component other than terephthalic acid and the ester-forming derivative thereof (comonomer component) include C8-C14 aromatic dicarboxylic acids such as isophthalic acid, phthalic acid, 2,6-naphthalenedicarboxylic acid, and 4,4'-dicarboxydiphenylether; C4-C16 alkyldicarboxylic acids such as succinic acid, adipic acid, azelaic acid, and sebacic acid; C5-C10 cycloalkyldicarboxylic acids such as cyclohexanedicarboxylic acid; and ester-forming derivatives (C1-C6 alkyl ester derivatives, acid halides, etc.) of these dicarboxylic acid components. These dicarboxylic acid components can be used alone, or two or more kinds thereof can be used in combination.

In polybutylene terephthalate, examples of the glycol component other than 1,4-butanediol (comonomer component) include C2-C10 alkylene glycols such as ethylene glycol, propylene glycol, trimethylene glycol, 1,3-butylene glycol, hexamethylene glycol, neopentyl glycol, and 1,3-octanediol; polyoxyalkylene glycols such as diethylene glycol, triethylene glycol, and dipropylene glycol; alicyclic diols such as cyclohexanedimethanol and hydrogenated bisphenol A; aromatic diols such as bisphenol A and 4,4'-dihydroxybiphenyl; C2-C4 alkylene oxide adducts of bisphenol A, such as 2 mol ethylene oxide adduct of bisphenol A and 3 mol propylene oxide adduct of bisphenol A; or ester-forming derivative (acetylated products, etc.) of these glycols. These glycol components can be used alone, or two or more kinds thereof can be used in combination.

It is possible to suitably use, as polybutylene terephthalate, any polybutylene terephthalate copolymer obtained by copolymerizing the above-described comonomer component. It is also possible to use, as polybutylene terephthalate, a homopolybutylene terephthalate polymer in combination with the polybutylene terephthalate copolymer.

In the polybutylene terephthalate resin composition, the kind of the polycarbonate is not particularly limited, and the content of the polycarbonate in the resin composition is 10% by mass or more and 50% by mass or less. The content is preferably 10% by mass or more because shock resistance is imparted. The content is preferably 50% by mass or less because deterioration of fluidity, and dry and heat resistance is suppressed. The content is more preferably 20% by mass or more and 25% by mass or less.

In the polybutylene terephthalate resin composition, the kind of the elastomer is not particularly limited. Use of an olefin-based elastomer or a core-shell elastomer is preferable, and use of a core-shell elastomer is most preferable.

Of olefin-based elastomers, an ethylene-glycidyl methacrylate copolymer is preferably used.

As mentioned above, use of a core-shell elastomer is preferable. Use of the core-shell elastomer enables an increase in fluidity of the resin composition, resulting in a resin composition having extremely excellent moldability. More specifically, the core layer of the core-shell elastomer is preferably composed only of a rubber component (soft component), and an acrylic rubber is suitably used as a rubber component. The rubber component used for the core layer preferably has a glass transition temperature (Tg) of lower than 0° C. (for example, −10° C. or lower), more preferably −20° C. or lower (for example, −180° C. or higher and −25° C. or lower), and particularly preferably −30° C. or lower (for example, −150° C. or higher and −40° C. or lower).

The acrylic rubber used as the rubber component is preferably a polymer which is obtained by polymerizing an acrylic monomer such as alkyl acrylate, as a main component. The alkyl acrylate used as the monomer of the acrylic rubber is preferably a C1-C12 alkyl ester of acrylic acid, such as butyl acrylate, and more preferably a C2-C6 alkyl ester of acrylic acid.

The acrylic rubber may be either a homopolymer or a copolymer of an acrylic monomer. In case the acrylic rubber is a copolymer of an acrylic monomer, it may be either a copolymer of acrylic monomers, or a copolymer of an acrylic monomer with the other unsaturated bond-containing monomer. In case the acrylic rubber is a copolymer, the acrylic rubber may be those obtained by copolymerizing a crosslinkable monomer.

A vinyl-based polymer is preferably used for a shell layer. The vinyl-based polymer is obtained, for example, by polymerizing or copolymerizing at least one monomer selected from among an aromatic vinyl monomer, a vinyl cyanide monomer, a methacrylic acid ester-based monomer, and an acrylic acid ester monomer. A core layer and a shell layer of such core-shell elastomer may be bonded with each other by graft copolymerization. The graft copolymerization is achieved by optionally adding a graft crossing agent capable of reacting with the shell layer upon polymerization of the core layer to thereby give a reaction group to the core layer, followed by formation of the shell layer. When using a silicone-based rubber as the graft crossing agent, organosiloxane having a vinyl bond or organosiloxane having thiol is used, and acryloxysiloxane, methacryloxysiloxane, or vinylsiloxane is preferably used.

The content of the elastomer in the resin composition is 5% by mass or more and 20% by mass or less. The content is preferably 5% by mass or more because shock resistance is imparted. The content is preferably 20% by mass or less because flame retardance is maintained. The content is preferably 10% by mass or more and 20% by mass or less, and particularly preferably 12% by mass or more and 18% by mass or less. The content is most preferably 13% by mass or more and 16% by mass or less.

In the polybutylene terephthalate resin composition, the kind of the flame retardant is not particularly limited, and a halogen-based flame retardant is preferable. Examples of the halogen-based flame retardant include a halogen-containing acrylic resin, a halogen-containing styrene-based resin, a halogen-containing polycarbonate-based resin, a halogen-containing epoxy compound, a halogenated polyaryl ether compound, a halogenated aromatic imide compound, a halogenated bisaryl compound, a halogenated alicyclic hydrocarbon, a halogenated tri(aryloxy)triazine compound, and the like.

Of halogen-based flame retardants, a bromine atom-containing organic bromide is preferable. Specific examples thereof include a bromine-containing acrylic resin, a bromine-containing styrene-based resin, a bromine-containing polycarbonate-based resin, a bromine-containing epoxy compound, a brominated polyarylether compound, a brominated aromatic imide compound, a brominated bisaryl compound, a brominated tri(aryloxy)triazine compound, and the like.

A halogen-based flame retardant (especially organic bromide) is preferably used as the flame retardant since it is easy to use in combination with an elastomer and shock resistance is less likely to deteriorate. Use of a bromine-containing acrylic resin is particularly preferable.

The polybutylene terephthalate resin composition preferably contains the flame-retardant auxiliary. Examples of the flame-retardant auxiliary include an aromatic resin (phenol-based resin, aniline-based resin, etc.), an antimony-containing compound, molybdenum-containing compound (molybdenum oxide, etc.), a tungsten-containing compound (tungsten oxide, etc.), a bismuth-containing compound (bismuth oxide, etc.), a tin-containing compound (tin oxide, etc.), an iron-containing compound (iron oxide, etc.), and a copper-containing compound (copper oxide, etc.). These flame-retardant auxiliaries can be used alone, or two or more kinds thereof can be used in combination.

Of these flame-retardant auxiliaries, an antimony compound is preferably used. Use of the antimony compound enables a further improvement in flame retardance of the resin composition. A combination of a bromine-containing acrylic resin and an antimony compound is particularly preferable.

The content of the flame-retardant auxiliary in the polybutylene terephthalate resin composition is not particularly limited, and is appropriately determined according to the kind and the content of the flame retardant.

The polybutylene terephthalate resin composition can also contain other components in the same manner as in the above thermoplastic resin composition.

Resin Molded Body

Regarding the resin molded body of the present invention, a Charpy impact value at 23° C. measured in conformity with ISO179/1eA is 15 kJ/m$^2$ or more, and flame retardance measured under the conditions of a thickness of 1.0 mm in conformity with UL94 is V-0 or more.

As mentioned above, use of a polycarbonate in combination with an elastomer enables suppression of deterioration of shock resistance of a resin molded body even when flame retardant is imparted to the resin molded body using a flame retardant. Accordingly, the resin molded body of the present invention has excellent shock resistance, and also has excellent flame retardance.

Since deterioration of shock resistance of the resin molded body due to inclusion of a flame retardant is less likely to occur, the resin molded body of the present invention is also capable of adjusting a Charpy impact value at −40° C. measured in conformity with ISO179/1eA to 5 kJ/m$^2$ or more.

As mentioned above, the resin molded body of the present invention scarcely causes problems even when used outdoors because of its excellent shock resistance, shock resistance under low temperature environment, and flame retardance.

"Used outdoors" means that the resin molded body of the present invention has excellent weather resistance. "Has excellent weather resistance" means that the resin molded body is excellent in all of heat resistance and moisture resistance to such a degree that no problem occurs even when exposed outdoors.

Specific preferred application examples of the resin molded body of the present invention include a connector for electrical and electronic parts, a plug, or a storage housing for storing electrical and electronic parts.

The resin molded body of the present invention is suitably used as a connector which is a component of a solar battery, a component of a breaker, a component of a switch, or a component of an electric vehicle among a connector for electrical and electronic parts.

EXAMPLES

Materials

Thermoplastic resin: polybutylene terephthalate resin (manufactured by WinTech Polymer Ltd., inherent viscosity: 0.875 dL/g)

Polycarbonate: manufactured by Teijin Chemicals Ltd., "Pan Light L-1225W"

Elastomer 1: Methacrylate butadiene styrene (manufactured by Rohm and Haas Japan KK, "PARALOID EXL2602")

Elastomer 2: Core-shell elastomer in which a core layer is made of an acrylic rubber and a shell layer is made of a vinyl-based polymer (manufactured by Rohm and Haas Japan KK, "PARALOID EXL2314"))

Elastomer 3: ethylene-glycidyl methacrylate copolymer (manufactured by Sumitomo Chemical Co., Ltd., "BOND-FAST 7M")

Elastomer 4: Polyester elastomer (manufactured by Mitsui Chemicals, Inc., "N TAFMER MP0620")

Flame retardant 1: Bromine-containing acrylic resin (manufactured by ICL-IP Japan KK, "FR1025")

Flame retardant 2: Bromine-containing epoxy compound (manufactured by ICL-IP Japan KK, "F3100")

Flame-retardant auxiliaries: Antimony trioxide (manufactured by Nihon Seiko Co., Ltd., "PATOX-M")

Dripping Inhibitor:

Stabilizer 1: Sodium dihydrogen phosphate (manufactured by Yoneyama Chemical Industry Co., Ltd., "monosodium phosphate")

Stabilizer 2: Phosphorous-based stabilizer (manufactured by ADEKA Corp., "Adekastab PEP36")

Antioxidant 1: Hindered phenol-based antioxidant (manufactured by Ciba Japan, "Irganox 1010")

Antioxidant 2: Diglycerin fatty acid ester (manufactured by Riken Vitamin Co., Ltd., "L7640"))

Production of Polybutylene Terephthalate Resin Composition

The above-mentioned materials were dry-blended in the ratio (unit is % by mass) shown in Table 1 below and the mixture was fed to a twin-screw extruder equipped with 30 mmφ screws (manufactured by Japan Steel Works, Ltd.) from a hopper, and then melt-kneaded at 260° C. to obtain a pellet-shaped polybutylene terephthalate resin composition.

Evaluation

Using specimens of Examples and resin compositions of Comparative Examples, shock resistance, low temperature impact resistance, combustibility, heat and moisture resistance, dry and heat resistance, and fluidity were evaluated by the following procedures.

[Shock Resistance]

The obtained pellet-shaped resin composition was injection-molded at a molding temperature of 260° C. and a mold temperature of 80° C. to produce Sharpy impact specimens, and then evaluation was performed under the condition of 23° C. according to evaluation criteria defined in ISO179/1eA. The evaluation results are shown in Table 1.

[Low Temperature Impact Resistance]

Shock resistance was evaluated in the same manner as in the above-mentioned shock resistance, except that the evaluation was performed under the conditions of −40° C. The evaluation results are shown in Table 1.

[Combustibility]

Using specimen (0.75 mm in thickness) obtained by injection molding of the obtained pellet-shaped resin composition at a molding temperature of 260° C. and a mold temperature of 80° C., combustibility was evaluated by a UL-94 vertical burning test of Underwriters Laboratories. The results are shown in Table 1.

[Heat and Moisture Resistance]

The resin compositions of Examples and Comparative Examples were injection-molded at a molding temperature of 260° C. and a mold temperature of 80° C. to produce tensile specimens in conformity with ISO3167. Subsequently, using the respective tensile specimens, a tensile strength and a tensile elongation were measured under the conditions of a temperature of 23° C. and a humidity of 50% in conformity with ISO527.

The tensile specimens produced by the above method were left to stand under the conditions of a temperature of 121° C. and a humidity of 100% for 50 hours (left to stand under a moisture and heat environment), and then a tensile strength and a tensile elongation were measured in conformity with ISO527. On the assumption that each of the tensile strength and the tensile elongation measured after molding is 100%, the tensile strength and the tensile elongation were evaluated after being left to stand under moisture and heat environment. The evaluation results are shown in Table 1.

[Dry and Heat Resistance]

The resin compositions of Examples and Comparative Examples were injection-molded at a molding temperature of 260° C. and a mold temperature of 80° C. to produce tensile specimens in conformity with ISO3167. Subsequently, using the tensile specimens, the tensile strength and the tensile elongation were measured under the conditions of a temperature of 23° C. and a humidity of 50% in conformity with ISO527.

Using a gear oven manufactured by Toyo Seiki Seisaku-Sho, Ltd., the tensile specimens produced by the above-mentioned method were left to stand under the conditions of a temperature of 150° C. for 300 hours (left to stand under dry and heat environment), and then the tensile strength and the tensile elongation were measured in conformity with ISO527. On the assumption that each of the tensile strength and the tensile elongation measured after molding is 100%, the tensile strength and the tensile elongation were evaluated after being left to stand under dry and heat environment. The evaluation results are shown in Table 1.

[Fluidity]

With respect to a pellet-shaped resin composition, using Capillograph 1B manufactured by Toyo Seiki Seisaku-Sho, Ltd., a melt viscosity at a shear rate of 1,000 sec$^{-1}$ was measured in conformity with ISO11443 under the conditions of a furnace temperature of 260° C. and a capillary of φ1 mm×20 mmL. The measurement results are shown in Table 1.

[Tracking Resistance]

In conformity with International Electrotechnical Commission (IEC) 112, Third Edition, and using an aqueous 0.1% ammonium chloride solution and a platinum electrode, an applied voltage (V: voltage) at which tracking occurs in specimen was measured.

According to the following evaluation criteria, a comparative tracking index was rated.

250 V or more and less than 400 V; 2
400 V or more and less than 600 V; 1
600 V or more; 0

TABLE 1

|  | Example |  |  |  |  |  |  | Comparative Example |  |  |  |  |
|---|---|---|---|---|---|---|---|---|---|---|---|---|
|  | 1 | 2 | 3 | 4 | 5 | 6 | 7 | 1 | 2 | 3 | 4 | 5 |
| PBT | 52.97 | 49.47 | 49.68 | 50.94 | 47.23 | 26.99 | 52.97 | 82.77 | 57.94 | 50.94 | 50.94 | 50.94 |
| PC | 22.7 | 21.2 | 21.29 | 21.83 | 20.24 | 40.48 | 22.7 | — | 24.83 | 21.83 | 21.83 | 21.83 |
| Elastomer 1 | — | — | — | — | — | — | — | — | — | 10 | — | — |

TABLE 1-continued

|  |  | Example | | | | | | | Comparative Example | | | | |
| --- | --- | --- | --- | --- | --- | --- | --- | --- | --- | --- | --- | --- | --- |
|  |  | 1 | 2 | 3 | 4 | 5 | 6 | 7 | 1 | 2 | 3 | 4 | 5 |
| Elastomer 2 | | 10 | 15 | 15 | — | — | — | — | — | — | — | 10 | — |
| Elastomer 3 | | — | — | — | 10 | 15 | 15 | 10 | — | — | — | — | — |
| Elastomer 4 | | — | — | — | — | — | — | — | — | — | — | — | 10 |
| Flame retardant 1 | | 10.4 | 10.4 | 10.4 | — | — | — | 10.4 | — | — | — | — | — |
| Flame retardant 2 | | — | — | — | 13.6 | 13.6 | 13.6 | — | 13.6 | 13.6 | 13.6 | 13.6 | 13.6 |
| Flame-retardant auxiliary | | 2.73 | 2.73 | 2.73 | 2.73 | 2.73 | 2.73 | 2.73 | 2.73 | 2.73 | 2.73 | 2.73 | 2.73 |
| Dripping inhibitor | | 0.3 | 0.3 | — | — | 0.3 | 0.3 | 0.3 | — | — | — | — | — |
| Stabilizer 1 | | 0.2 | 0.2 | 0.2 | 0.2 | 0.2 | 0.2 | 0.2 | 0.2 | 0.2 | 0.2 | 0.2 | 0.2 |
| Stabilizer 2 | | 0.1 | 0.1 | 0.1 | 0.1 | 0.1 | 0.1 | 0.1 | 0.1 | 0.1 | 0.1 | 0.1 | 0.1 |
| Antioxidant 1 | | 0.3 | 0.3 | 0.3 | 0.3 | 0.3 | 0.3 | 0.3 | 0.3 | 0.3 | 0.3 | 0.3 | 0.3 |
| Antioxidant 2 | | 0.3 | 0.3 | 0.3 | 0.3 | 0.3 | 0.3 | 0.3 | 0.3 | 0.3 | 0.3 | 0.3 | 0.3 |
| Shock resistance (kJ/m$^2$) | | 17.6 | 53.5 | 49.5 | 18.2 | 76.6 | 65.6 | 23.4 | 2.8 | 3.3 | 13.7 | 13.7 | 11.4 |
| Low temperature impact resistance (kJ/m$^2$) | | 6.1 | 9.4 | 6.8 | 6.1 | 6.8 | 12.1 | 6.1 | 2.9 | 3.1 | 10.2 | 6.1 | 6 |
| Combustibility (UL94) | | V-0 | V-0 | V-0 | V-0 | V-0 | V-0 | V-0 | V-0 | V-0 | V-0 | V-0 | V-2 |
| Heat and moisture resistance | Tensile strength retention (%) | 96 | 96 | 95 | 95 | 93 | 97 | 96 | 31 | 25 | 87 | 95 | — |
|  | Tensile elongation retention (%) | 29 | 35 | 38 | 35 | 33 | 36 | 35 | 7 | 5 | 5 | 29 | — |
| Dry and heat resistance | Tensile strength retention (%) | 100 | 100 | 100 | 100 | 100 | 100 | 100 | 100 | 100 | 100 | 100 | — |
|  | Tensile elongation retention (%) | 115 | 91 | 93 | 103 | 94 | 97 | 120 | 55 | 48 | 7 | 89 | — |
| Fluidity (kPa · s) | | 0.30 | 0.35 | 0.33 | 0.36 | 0.38 | 0.37 | 0.30 | 0.19 | 0.28 | 0.30 | 0.31 | 0.27 |
| Comparative tracking index | | 0 | 0 | 0 | 1 | 1 | 1 | 1 | 2 | 2 | 2 | 2 | 2 |

The results revealed that all resin molded bodies of Examples 1 to 6 have excellent flame retardance, and are also excellent in shock resistance and also excellent in shock resistance at low temperature and tracking resistance.

The evaluation results of heat and moisture resistance and those of dry and heat resistance in Examples 1 and 2 revealed that even when shock resistance, flame retardance, and the like are imparted to the resin molded bodies by using a polycarbonate, an elastomer and a flame retardant in combination, the resin molded bodies are also excellent in weather resistance.

The results revealed that the resin molded bodies using a core-shell elastomer of Examples 1 to 3 are excellent in fluidity, and are also particularly excellent in tracking resistance as compared with the resin molded bodies using EGMA of Examples 4 and 5.

The results of Comparative Example 1 revealed that when containing neither a polycarbonate nor an elastomer, shock resistance deteriorates, while the results of Comparative Example 2 revealed that even when containing only a polycarbonate, shock resistance is not improved.

The results of Examples and Comparative Examples 3 to 5 revealed that when a combination of an elastomer and a flame retardant is appropriately selected, the resin molded bodies have excellent flame retardance, and are also excellent in shock resistance and also excellent in shock resistance at low temperature.

The invention claimed is:

1. A resin molded body, which is used outdoors, composed of a thermoplastic resin composition consisting of a polybutylene terephthalate, a polycarbonate, a core shell elastomer, and a flame retardant, or a thermoplastic resin composition consisting of a polybutylene terephthalate, a polycarbonate, a core-shell elastomer, a flame retardant, and at least one component selected from the group consisting of a flame-retardant auxiliary, a dripping inhibitor, a stabilizer, an antioxidant, a mold releasant and a colorant, wherein the flame retardant is selected from a bromine-containing acrylic resin and a bromine-containing epoxy compound, a Charpy impact value at 23° C. measured in conformity with ISO179/1eA is 15 kJ/m$^2$ or more, and flame retardance measured under the conditions of a thickness of 1.0 mm in conformity with UL94 is V-0 or more.

2. The resin molded body according to claim 1, wherein a Charpy impact value at −40° C. measured in conformity with ISO179/1eA is 5 kJ/m$^2$ or more.

3. The resin molded body according to claim 1, which is a connector for electrical and electronic parts, a plug, or a storage housing for storing electrical and electronic parts.

4. The resin molded body according to claim 3, wherein the connector is a component of a solar battery, a component of a breaker, a component of a switch, or a component of an electric vehicle.

5. The resin molded body according to claim 1, wherein the thermoplastic resin composition contains:
   25% by mass or more and 70% by mass or less of polybutylene terephthalate,
   10% by mass or more and 50% by mass or less of a polycarbonate,
   5% by mass or more and 20% by mass or less of an elastomer, and
   10% by mass or more and 15% by mass or less of a flame retardant.

6. The resin molded body according to claim 1, wherein the flame retardant is a bromine-containing acrylic resin, and the thermoplastic resin composition contains 2% by mass or more and 10% by mass or less of antimony trioxide as the flame-retardant auxiliary.

7. The resin molded body according claim 1, wherein the thermoplastic resin composition exhibits a melt viscosity of 0.20 kPa·s or more and 0.40 kPa·s or less at a temperature of 260° C. and a shear rate of 1,000 sec$^{-1}$.

8. The resin molded body according to claim 1, wherein the thermoplastic resin composition exhibits a comparative tracking index of 0 or 1 measured in conformity with IEC112, Third Edition, using an aqueous 0.1% ammonium chloride solution and a platinum electrode.

9. The resin molded body according to claim 1, wherein the thermoplastic resin composition exhibits a comparative tracking index of 0 measured in conformity with IEC112, Third Edition, using an aqueous 0.1% ammonium chloride solution and a platinum electrode.

* * * * *